2,992,094
RECLAIMING SCRAP TITANIUM
Robert L. Powell, Las Vegas, Nev., and Luh C. Tao, Lincoln, Nebr., assignors to Titanium Metals Corporation of America, New York, N.Y., a corporation of Delaware
No Drawing. Filed Mar. 23, 1959, Ser. No. 800,954
4 Claims. (Cl. 75—10)

This invention relates to the reclaiming and remelting of titanium and its alloys.

Commercial scrap of metals such as titanium and titanium base alloys is of varying size, shape and chemical composition. Therefore, scrap must generally be subdivided so that it may be uniformly mixed and sampled and analyzed, and also to put it in form for uniform admixture with virgin metal for remelting, or for remelting by itself. Thin sheet scrap may be cut up into small pieces, but massive scrap, having often no common dimension, and being of widely varying size and shape, has heretofore posed a serious problem, aggravated by the high sttrength of titanium and titanium alloys.

It is therefore a principal object of this invention to provide an improved method for reclaiming and remelting scrap of titanium and titanium base alloys. Another object of this invention is to provide a method for reclaiming and remelting scrap of titanium and titanium base alloys to produce an improved remelted product. These and other objects of this invention will be apparent from the following description thereof.

This invention in its broadest aspects contemplates hydrogenating titanium or titanium base alloy scrap to produce friable metal which may readily be crushed to the necessary degree of subdivision. The hydrogenated crushed scrap is then vacuum melted in an arc furnace. The ingots produced by melting such material are characterized by greater purity and improved surface compared to ingots produced by melting titanium metal and alloys which do not contain such amounts of hydrogen.

The hydrogenation process is carried out by subjecting the scrap to gaseous hydrogen at an elevated temperature. Conveniently this step of the process may be accomplished by placing the scrap in a closed chamber, maintaining a hydrogen atmosphere in the chamber while maintaining the scrap at a temperature between 550° C. and 800° C. for from one to ten hours or longer depending on the size pieces, total batch weight and character of the scrap. The particular time and temperature conditions employed should result in a hydrogen content in the scrap of between 1% and 2% by weight. Higher hydrogen content than this will be disadvantageous. In addition to a long necessary treatment time, it will result in a hydrogenated product which will tend to disintegrate to powder on crushing. Lower contents of hydrogen will not produce sufficient embrittlement of the scrap to make possible easy and economical subdivision by conventional crushers into the desired size particles or chunks. Subdivision into particles of maximum diameter up to about one-half inch, is preferred, although smaller or larger particles may be produced by adjustment of the crushing action if desired.

The crushing operation is conducted employing suitable and conventional crushing equipment such as a jaw crusher, hammer mill or other similar type of equipment. The degree of subdivision of the product will be regulated by suitable adjustment of the crusher, the rate of feed of the hydrogenated titanium and other factors well known to those skilled in the art.

Aftere crushing, the subdivided hydrogenated scrap is remelted under vacuum in an arc furnace, and it is a unique feature of this invention that an intermediate dehydrogenation step is not required, providing the hydrogen content of the scrap is within the limits defined above, and provided the gas pressure in the furnace does not exceed about 10 millimeters of mercury absolute. Such crushed hydrogenated scrap is advantageously admixed with virgin metal, and other alloying elements if desired or necessary, and compacted to form an electrode which is melted under vacuum in a consumable electrode arc furnace. The subdivided hydrogenated scrap is readily combined with virgin metal for this purpose, the amount of scrap incorporated being dependent on its composition and the type of metal or alloy desired in the melted ingot. Ordinarily not more than 50% scrap will be employed in producing a compact electrode since the hard nature of the hydrogenated scrap tends to structurally weaken the electrode at contents much higher than this. With the scrap containing from 1% to 2% hydrogen (by weight) the electrode formed from it will contain up to 1% hydrogen, assuming not more than a 50% scrap content. It has been found that if the hydrogen content of the electrode, provided by the presence of between 5% and 50% of hydrogenated scrap metal, is between .05% and 1% an extremely beneficial effect on the surface character of the ingot produced will result. The precise reason for this effect is not well understood but it is postulated that hydrogen gas, released at the high temperature and vacuum in the furnace sweeps away impurities which otherwise tend to collect or condense on the ingot mold walls or outer surface of the ingot. Since the hydrogen is continually generated from the metal itself while being melted, a very efficient scavenging action results. The ingot produced under these conditions will be characterized by a smoother, cleaner outer surface which represents a substantial improvement over such ingots ordinarily produced, which must almost always be conditioned by machining off a layer of elephant skin appearing metal and impurities to obtain an acceptable surface.

The melting operation is carried out employing the required electric current and electrode movement control to produce transfer of metal to form the ingot in the ingot mold. It is necessary during melting that the furnace be evacuated to a pressure of not exceeding 10 millimeters of mercury absolute and preferably less than 1 millimeter. Under these conditions the hydrogen content of the electrode will be effectively volatilized and removed from the metal by the action of the vacuum pumping equipment and an ingot containing hydrogen below an acceptable maximum, that is, less than about 100 parts per million, may readily be produced. Residual pressures higher than 10 millimeters will not provide proper dehydrogenation and required ingot purity.

If desirable, or more convenient, the hydrogenated and subdivided scrap may be melted by separately feeding into an arc furnace in which a consumable electrode is being melted. This procedure avoids the structural weakening of the electrode by reason of the scrap addition thereto. Since, however, the heat from the arc is required to melt the electrode and separately added scrap, the amount of scrap fed into the furnace should not exceed about 40% of the electrode metal being simultaneously melted. Low pressure conditions in the furnace, as previously described herein, are necessary for proper hydrogen removal, and an improved ingot of acceptable hydrogen content will be obtained.

It will be appreciated by those skilled in the art that vacuum pumping equipment of adequate capacity must be employed to maintain the required evacuation of the furnace during melting. The process of this invention will require large capacity vacuum pumps since an appreciable amount of hydrogen must be pumped out of the furnace while melting and at the same time the furnace evacuation must be maintained at a pressure not exceeding 10 millimeters of mercury absolute. In addition, the scavenging action in the furnace removes a considerable amount of dust, salts, and other impurities therefrom and suitable means should be provided for separating such material from the gas stream to protect the pumps. Or, in the alternative, pumps of a type not seriously affected by such amounts of solids in the pumped gases, should be employed.

The following example describes a selected embodiment of the process of this invention.

*Example 1*

Various size pieces of 1 inch diameter rod of scrap titanium base alloy containing 6% aluminum and 4% vanadium were charged into a closed container and heated at a temperature between 650° C. and 800° C. for about five hours with the atmosphere in the container composed of hydrogen at 6 pounds per square inch (gauge) pressure. This treatment produced a hydrogenated scrap metal containing 1.5% hydrogen. After cooling and discharge from the furnace, the hydrogenated scrap was crushed in a jaw type crusher to minus one-half inch pieces and recrushed to provide a product of maximum one-fourth inch diameter particles.

An electrode to be employed in a consumable electrode arc furnace was formed by fabricating compacts and welding these together to form an integrated elongated mass. The compacts constituting this electrode were composed of the following:

|  | Percent |
|---|---|
| Virgin titanium sponge | 71.84 |
| Aluminum and vanadium alloying additions | 8.16 |
| Crushed hydrogenated scrap produced as above | 20.0 |
| Total | 100.0 |

To form the electrode, the hydrogenated scrap was admixed with the virgin titanium metal sponge and alloying ingredients and compacted in a press, and the compacts welded together employing inert gas shielded arc welding.

The so-formed consumable electrode was placed in the electrode carrier of a conventional vacuum arc melting furnace having a 3½ inch inside diameter water cooled crucible. Arc current of 1500 amperes at 30 volts was applied while maintaining a pressure in the furnace, by connection thereto of conventional vacuum pumping equipment, of between 3 and 5 millimeters of mercury absolute. Control of the electrode carrier was obtained by employment of a conventional amplidyne unit which maintained the desired 30 volts and the proper spacing, melting rate and arc characteristics.

The melting operation proceeded normally and the ingot, on removal from the crucible, was found to have a smooth outer surface. There appeared to be little surface accumulation by salts and other impurities. The elephant skin appearance which is characteristic of ordinary ingots melted under the same general conditions and in the same type apparatus, was not shown by the ingot produced in the practice of this example.

Analysis of the so-produced 10 pound ingot showed a hydrogen content of .0081% which is acceptably low.

Hydrogen specifications for titanium alloy products may require a maximum content as low as .0150% or even .0125%. This may be obtained by the process of this invention in a single melted ingot, however, those skilled in the art will understand that a second melting, as customarily practiced, will produce a further refinement including reduction of hydrogen content in the remelted ingot.

It is a unique feature of this invention that hydrogenated scrap may be melted directly to produce a substantially hydrogen free ingot. Hydrogen in fabricated titanium or titanium alloy products is disadvantageous in that it promotes notch sensitivity and embrittlement, and may result in disastrous cracking under stress and at elevated temperature, as may be encountered, for example, in aircraft service. Efforts have heretofore been made to provide as low as possible hydrogen content feed material to the melting furnace in order to insure that the produced ingot will be below the stringent specifications for this impurity. Since our discovery, however, it is apparent that low hydrogen feed is not essential, and that under the conditions described herein, an appreciable hydrogen content in added scrap will not produce a high hydrogen content ingot, and, in addition, a marked and beneficial improvement in the surface condition and over all purity of the ingot results.

We claim:

1. A method for reclaiming scrap metal selected from the group consisting of titanium and titanium base alloys which comprises; hydrogenating said scrap metal to provide a hydrogen content therein of between 1% and 2% by weight, crushing the hydrogenated scrap metal, admixing the crushed hydrogenated scrap metal with virgin titanium metal, and melting the so-formed admixture in an arc melting furnace evacuated to a pressure not exceeding 10 millimeters of mercury absolute thereby to produce an ingot containing less than 0.01% hydrogen.

2. A method for reclaiming scrap metal selected from the group consisting of titanium and titanium base alloys which comprises; hydrogenating said scrap metal to provide a hydrogen content therein of between 1% and 2% by weight, crushing the hydrogenated scrap metal, admixing the crushed hydrogenated scrap metal with virgin titanium metal, in amount so that the crushed hydrogenated scrap constitutes between 5% and 50% by weight of the admixture and melting the so-formed admixture in an arc melting furnace evacuated to a pressure not exceeding 10 millimeters of mercury absolute thereby to produce an ingot containing less than 0.01% hydrogen.

3. A method for reclaiming scrap metal selected from the group consisting of titanium and titanium base alloys which comprises; hydrogenating said scrap metal to provide a hydrogen content therein of between 1% and 2% by weight, crushing the hydrogenated scrap metal to a size of less than one-half inch maximum diameter, admixing the crushed hydrogenated scrap metal with virgin titanium metal, and melting the so-formed admixture in an arc melting furnace evacuated to a pressure not exceeding 10 millimeters of mercury absolute thereby to produce an ingot containing less and 0.01% hydrogen.

4. A method of reclaiming scrap metal selected from the group consisting of titanium and titanium base alloys which comprises; hydrogenating said scrap metal to provide a hydrogen content therein of between 1% and 2% by weight, crushing the hydrogenated scrap metal, admixing the crushed hydrogenated scrap metal with virgin titanium metal, forming a consumable electrode from the admixture of crushed hydrogenated scrap metal and virgin titanium metal, and melting said electrode in an arc melting furnace evacuated to a pressure not exceeding 10 millimeters of mercury absolute thereby to produce an ingot containing less than 0.01% hydrogen.

References Cited in the file of this patent

UNITED STATES PATENTS

| 1,952,927 | Langmuir | Mar. 27, 1934 |
| 2,107,279 | Balke | Feb. 8, 1938 |
| 2,640,860 | Herres | June 2, 1953 |
| 2,818,461 | Gruber | Dec. 31, 1957 |
| 2,892,742 | Zwicker | June 30, 1959 |

OTHER REFERENCES

WADC TR 54–305, part 1 (pages II–2–5 and II–2–6).